United States Patent [19]

Neitz

[11] Patent Number: 4,492,193
[45] Date of Patent: Jan. 8, 1985

[54] METHOD OF OPERATING INTERNAL COMBUSTION ENGINES

[75] Inventor: Alfred Neitz, Röthenbach, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 281,517

[22] Filed: Jul. 8, 1981

Related U.S. Application Data

[63] Continuation-in-part of Ser. No. 79,156, Sep. 26, 1979, abandoned.

[51] Int. Cl.³ .............................................. F02B 3/04
[52] U.S. Cl. .................................. 123/276; 123/260; 123/261; 123/262; 123/263
[58] Field of Search ............... 123/276, 260, 261, 262, 123/263, 281

[56] References Cited

U.S. PATENT DOCUMENTS

| 4,278,057 | 7/1981 | Urlaub et al. | 123/276 |
|---|---|---|---|
| 4,294,206 | 10/1981 | Urlaub et al. | 123/276 |
| 4,368,702 | 1/1983 | Finsterwalder et al. | 123/276 |
| 4,370,958 | 2/1983 | Pischinger et al. | 123/276 |

FOREIGN PATENT DOCUMENTS

| 2525770 | 12/1976 | Fed. Rep. of Germany | 123/30 C |
|---|---|---|---|
| 2658833 | 7/1978 | Fed. Rep. of Germany | 123/139 AF |
| 2709161 | 9/1978 | Fed. Rep. of Germany | 123/30 C |

Primary Examiner—Raymond A. Nelli
Attorney, Agent, or Firm—Becker & Becker, Inc.

[57] ABSTRACT

A method of operating air-compressing direct-injecting internal combustion engines including at least one piston with a combustion chamber of a shape of a body of rotation, and a fuel injector with a controllable outlet and a throttle member for controlling the fuel injection-pressure is disclosed. The velocity of combustion air rotating about the longitudinal central axis of the combustion chamber and the velocity of the fuel stream when leaving the injector are coordinated to one another. The surface area of the fuel which is contactable by combustion air is controllable so that on increase of the speed of the internal combustion engine the surface area is decreased.

8 Claims, 17 Drawing Figures

METHOD OF OPERATING INTERNAL COMBUSTION ENGINES

This is a continuation-in-part of co-pending parent application Ser. No. 079,156—Neitz filed Sept. 26, 1979, now abandoned.

The present invention relates to a method of operating air-compressing direct-injecting internal combustion engines having at least one piston, a cylinder therewith also having a cylinder head, and a combustion chamber in the at least one piston which combustion chamber has a shape of a body of rotation. Such engines also include means for introducing air, with the combustion chamber therewith being adapted to accomodate rotating movement of air about its longitudinal central axis. Such engines further include fuel injector means having an orifice or outlet of which the effective cross-sectional area is selectively controllable, and having a throttle member by means of which the fuel injection-pressure at the outlet and, accordingly, the exit velocity of the fuel jet can be maintained at least nearly constant over the full operating range of an engine. The fuel injector means serves to introduce the fuel in the direction of movement of air in the combustion chamber during at least one of the conditions including both upper speed range and lower speed range, with the fuel being adapted to be deposited as a film at least partially on the wall or walls of the combustion chamber therewith; while during idling of such combustion engines and during at least one of the conditions including both lower speed range and lower load range, a direct mixing of combustion air and fuel occurs.

BACKGROUND OF THE INVENTION

It has been attempted in a known combustion engine to improve the mixture-formation, and, accordingly, combustion during idling in the lower speed range and in the lower load range, whereby the fuel injected under these conditions is mixed with the combustion air directly, because the required temperatures, i.e. the temperature required for the particular combustion technique and the temperature required on the combustion chamber wall, for a sufficiently rapid evaporation or combustion of the fuel deposited as a film were not present, which was confirmed by the poor quality of the exhaust gases and the resulting engine data.

In order to overcome this drawback, a number of proposals have been set forth. However, all these proposals have entailed still further drawbacks. Thus, either the arrangements involved were too expensive or too complicated, or the advantages which are realized when depositing the fuel on the combustion chamber wall at the upper operating range of the engine, were offset in part because of detrimental developments.

Internal combustion engines as briefly described in the foregoing have brought about a true improvement with simple, yet effective means but it has been shown that the degree of spraying or atomization of the fuel should be increased during the lower operating ranges of such engines in order to realize further improvements.

BRIEF SUMMARY OF THE INVENTION

This is the starting point of the present invention which has as its object to provide a method of operating air-compressing direct-injecting internal combustion engines so that during idling and in the lower speed range and load range of the engine an optimal spray distribution or atomization of the fuel is obtained, and a direct mixing of the combustion air with the fuel occurs without detrimentally affecting the operating characteristics of the engine in the upper operating ranges thereof.

This object, and other objects and advantages of the present invention will appear more clearly from the following specification in connection with the accompanying drawings in which:

FIGS. 4 and 4a is a schematic diagram of an arrangement having features according to the present invention. FIG. 4a shows a discharge cross section of a hole nozzle.

FIGS. 7a, 7b and 7c show differing diameter relationships of a pin nozzle.

DETAILED DESCRIPTION

The invention is characterized primarily therein that the velocity of the combustion air, which is adapted to rotate about the longitudinal central axis of the combustion chamber, and the exit velocity of the fuel jet or stream emanating from the fuel injector means are coordinated to one another in such a way that they are at least nearly equal at the rated speed of the engine near the fuel stream entry into the system.

The invention is further characterized primarily therein that the velocity of the combustion air is reduced when the speed of the engine is decreased to provide a relative velocity or velocity difference between exit velocity of the fuel at the nozzle outlet and combustion air velocity.

Figure 1:
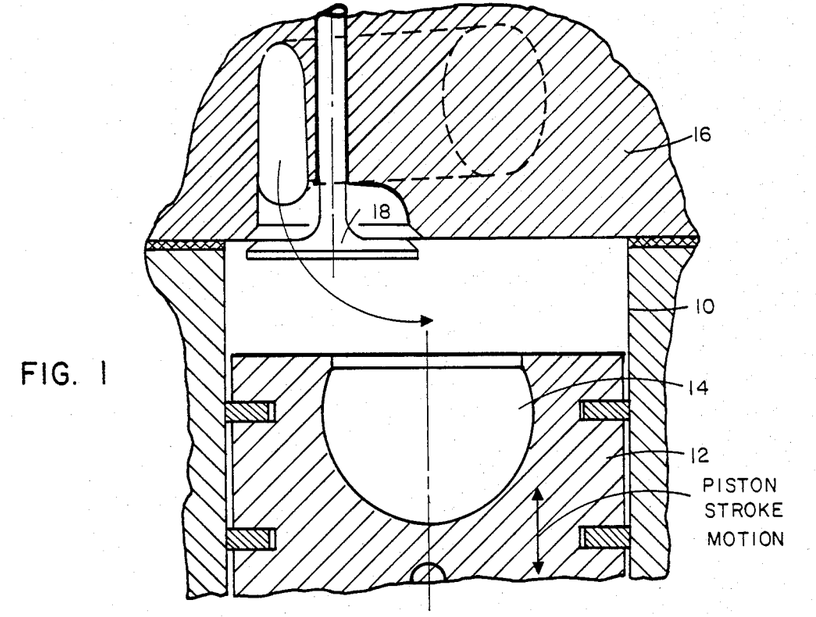
FIG. 1 is a partially sectioned fragmentary elevational view of a piston-cylinder arrangement having features according to the present invention.

Referring now to the drawings in detail, FIG. 1 shows schematically the generation or creation of air rotational movement around the combustion chamber longitudinal axis. The peripheral speed or velocity of the air rotational movement is dependent upon the piston speed or velocity and accordingly dependent upon the motor speed. Important however is the peripheral speed in the combustion chamber in the vicinity of the fuel stream or flow. This peripheral speed in the combustion chamber results with the compression during the flowing-in into the combustion chamber and through the transition of the cylinder diameter to the combustion chamber diameter. This speed has set forth in accordance with the present invention is approximately proportional to the motor speed.

Figure 2A:
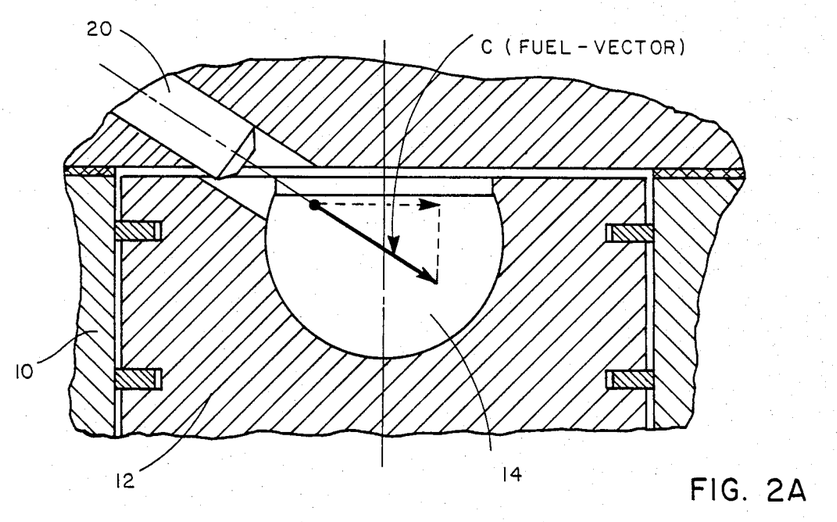
FIG. 2A is an enlarged view of the arrangement similar to that of FIG. 1.
Figure 2B:
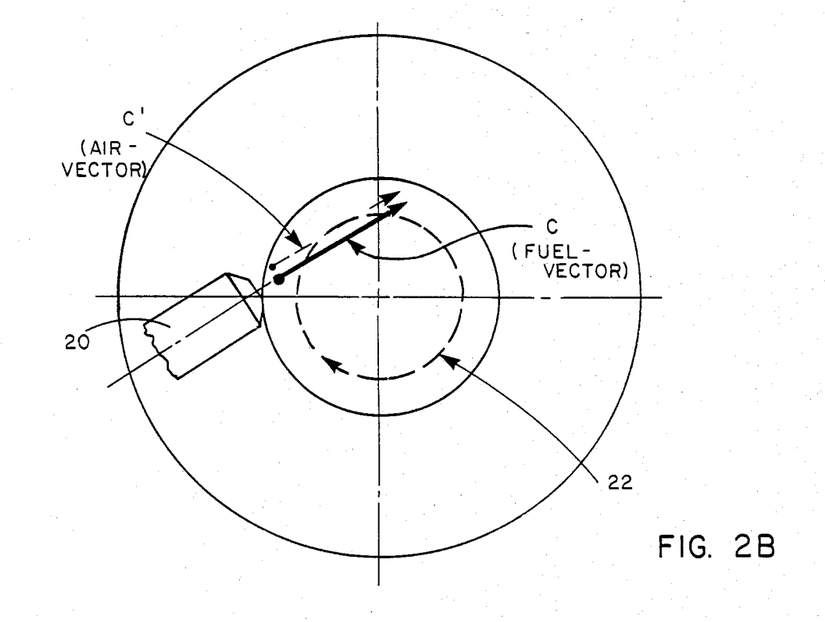
FIG. 2B is a plan view of the arrangement of FIG. 2A.

FIG. 2 represents and illustrates the fuel injection speed of the fuel as characterized by a vector length. The vector of the air speed in the same direction has the same length as claimed (at rate of speed). Strictly considered, there should only be inserted the horizontal component of the fuel speed or velocity.

Figure 3:
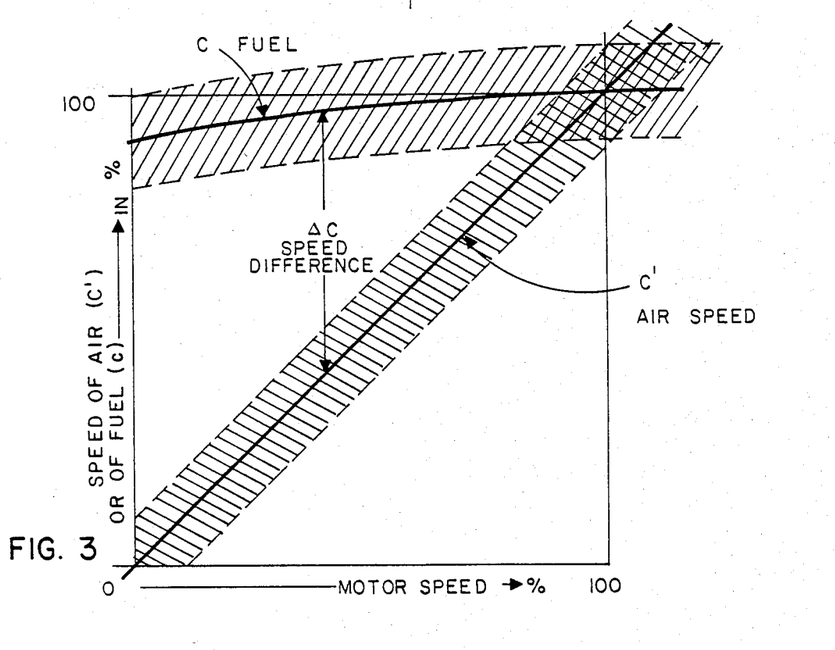
FIG. 3 is a graph illustrating features of the present invention.

In the diagram of FIG. 3 there is shown the differential speed between the fuel and air growing or increasing with dropping motor speed. Apparent from FIG. 3 is that the speed of the air decreases approximately proportional with the motor speed. In contrast, the speed of the fuel is kept approximately or substantially constant with dropping or decreasing speed.

Figures 4, 4A, 7B, 7C:
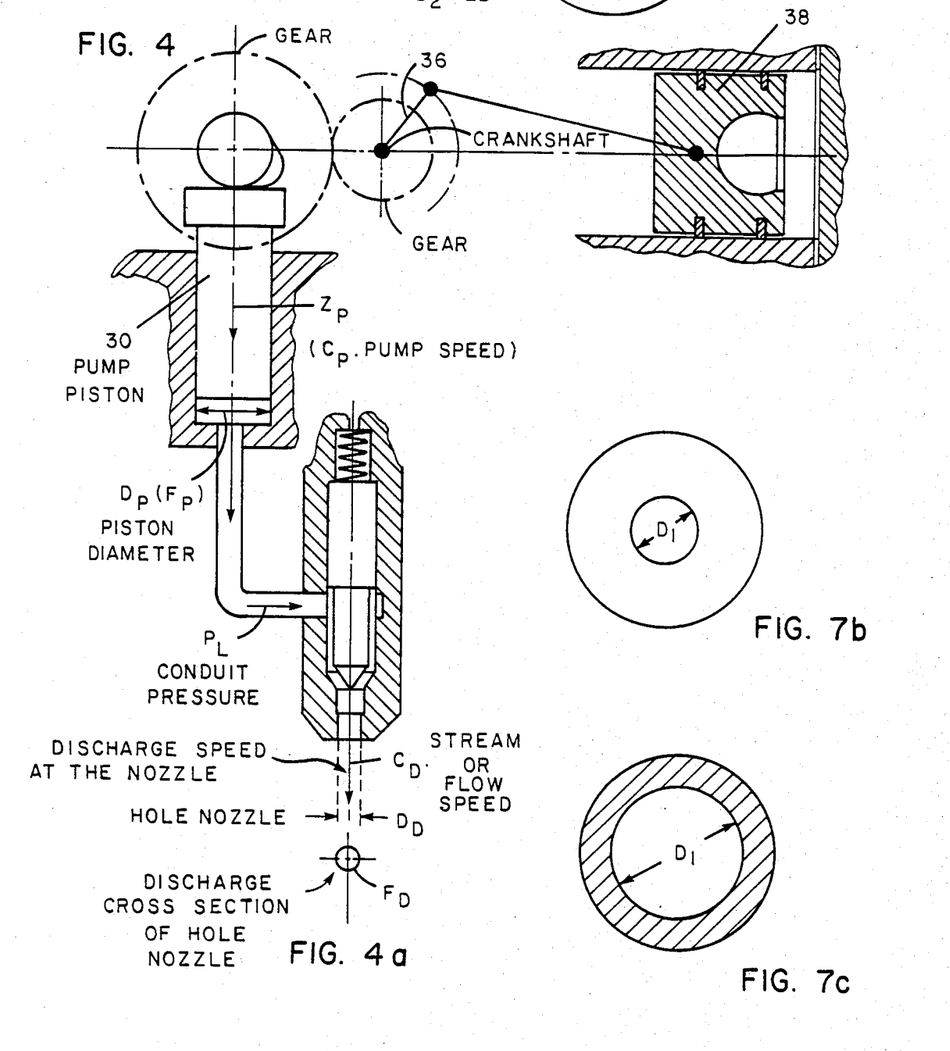

FIG. 4 shows in principle a conventional injection system with a geometrically unchangeable outlet opening (optimum arrangement of single-hole-injection nozzle). The middle speed of the cam-driven pump piston changes proportional with the motor speed. If an infantly rigid injection system is presumed, then the outlet or discharge speed of the fuel at the nozzle equals the pump piston speed times the ratio of piston cross section $F_P$ to nozzle cross-section $F_D$. The pressure before the nozzle bore is defined according to the equation:

$$\text{(pressure level) } h = \frac{C_D{}^2}{2g}$$

which means the line pressure $P_L$ rises with the square of the stream speed. Since this changes proportional to the motor speed, also the line pressure rises with the square of the speed change. According to experience, this quadratic dependance is not fully given since in practice the injection system is resiliently or elastically escaping or diverging from the high pressures. The determination of the nozzle bore in such an injection system accordingly represents a compromise in view of the pressure build-up or the streams or flow speed. An advantageous embodiment or arrangement for the upper speed range leads thereto that the injection pressure and accordingly the stream or flow speed in the lower speed range collapse or break down very strongly with the negative consequences for the mixture preparation.

Figure 5A:
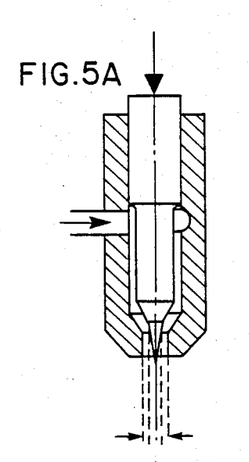
FIGS. 5A, 5a and 5B, 5b show differing positions of a pin nozzle in FIG. 4.
Figure 5B:
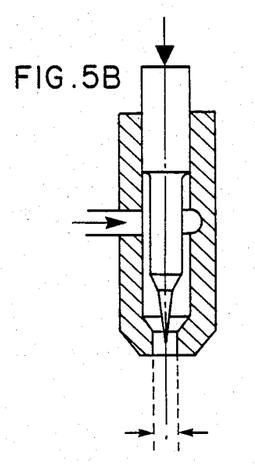

FIGS. 5a and 5b show in principle the construction, build up or arrangement of the cross sectional control with the aid of a pin or needle nozzle. An abutment or stop variable with the speed for the maximum pin or needle stroke or lift controls the depths of insertion or dipping of the pin or stud in the bore and accordingly controls the output or discharge cross section. The illustration of FIG. 5a under these circumstances represents a low speed and FIG. 5b represents a high speed. There is proceeded on the basis that at high speed the pin or needle projects or dips out completely and opens or releases the complete cross section of the injection hole, then with dropping speed the pin or needle must remain inserted or dipped-in so far that in spite of decreasing or dropping speed at the pump piston in the resulting ring or annular gap the same or identical discharge speed remains maintained as at high speed.

Figure 6A:
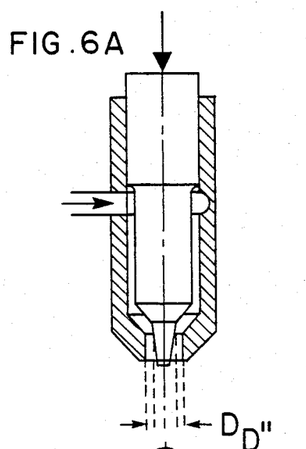
FIGS. 6A, 6a and 6B, 6b show differing positions of a pin nozzle in FIG. 4.
Figure 6B:
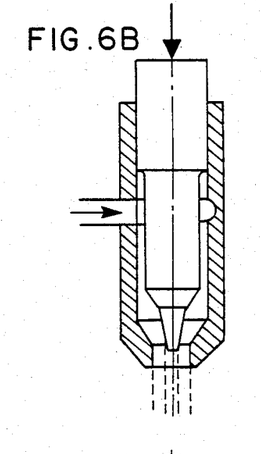

FIGS. 6a and 6b show the enlargement of the outer diameter with the present inventive pin or stud nozzle with which the rate of speed is without effect because of the speed difference zero whereas the speed difference existing or prevailing at low speeds and the given frictional influence accordingly lead to a strong stream disassociation or dissolving. The control of the pressure or the stream or flow speed to the same, identical or substantially identical values at all speeds is provided and given thereby that now also at high speed the pin or needle still dips-in and consequently creates the necessary outlet or discharge cross section $F_D$ as the ring or annular gap.

In FIG. 1 there is shown a cylinder 10 having a piston 12 with a combustion chamber 14 in the top of the piston 12 which is reciprocable in a chamber defined by the cylinder 10 and covered by the cylinder head 16. An inlet valve 18 is also shown near the top of FIG. 1. The rotational movement of the air is attained by a valve with a deflector or by special formation of the inlet passage (twist passage). FIG. 1 is understood to have crankshaft and gear configuration therewith similar to that of the piston and cylinder arrangement of FIG. 4. FIG. 2A shows an injection nozzle 20 located extending upwardly at an incline above the combustion chamber 14 in the top of the piston 12 which is reciprocable in the cylinder 10. A reference designation c and a vector C represent the injected fuel stream. In FIG. 2B there is shown the same vector C for the fuel as well as a dash line in a circle with an arrow representing the air twist 22 and a reference designation c' as well as a vector C' represent the air speed. In FIG. 3 the vector C represents the fuel and the vector C' represents the air with a vertical arrow representing $\Delta C$ in a graph having a horizontal coordinate ranging from 0 to 100% for the motor speed and a vertical coordinate representing the percentage of the speed C' of the air or of the fuel (C).

FIG. 4 illustrates a pump piston 30 reciprocable at a pump speed $Z_P$ as well as a conduit 32 having line pressure $P_L$ therein. The discharge speed $C_D$ at the jet or nozzle (flow or stream speed) as well as the outlet or discharge cross section $F_D$ of a hole-nozzle $D_D$ are also represented in FIG. 4 and/or FIG. 4a. FIG. 4 also shows a crankshaft 36 and a cylinder piston 38. Stroke movement of the piston in FIGS. 1 and 4 occurs with an up-and down motion of the piston converted into rotary motion by the connecting rod and crankshaft (FIG. 4).

FIGS. 5a and 5b show different positions of the pin or needle valve of the nozzle for differing cross sections $F_{D'}$ in FIG. 5a and $F_{D''}$ in FIG. 5b. Each of the outlet or discharge cross sections as a circular or annular shape with the throttle-pin or needle nozzle. FIGS. 6a and 6b show additional variations in position of another configuration of pin or needle nozzle or jet.

The present invention provides a method of operating air-compressing direct-injecting internal combustion engines having at least one piston, a pertaining cylinder having a pertaining cylinder head, a combustion chamber formed in said at least one piston, means for introducing air, said combustion chamber in said at least one piston having a shape of a body of rotation and being adapted to accommodate movement of air about its longitudinal central axis, injector means for introducing fuel in the direction of movement of air in said combustion chamber and depositing same at least in part as a film on the wall of said combustion chamber in said piston during at least one of the conditions consisting of the group of upper speed range and lower load range, while during idling of said combustion engine and during at least one of the conditions consisting of lower speed range and lower load range a substantially direct mixing of combustion air and fuel occurs, said injector means having an outlet the effective cross sectional area of which is selectively controllable, said method comprising the steps of:

introducing combustion air into said combustion chamber to rotate about said longitudinal axis at a predetermined velocity;

introducing a fuel stream at a predetermined velocity into said combustion chamber, said fuel stream, when leaving said injector means, having a velocity which is approximately equal to the combustion air velocity when said engine is operating at its rated speed;

way of the enlarged peripheral surface of the hollow stream there is offered for the air an essentially larger engagement surface. Expressed in different wording the following can be stated: by way of the decreasing speed of the combustion air at smaller speeds there is formed a relative speed with substantially uniformly remaining constant discharge speed of the fuel stream (fixed upon the greatest speed) through which friction or rubbing results between the fuel and combustion air with such friction bringing about a more effective stream disintegration in accordance with the greater peripheral surface thereof.

The discharge speed remaining substantailly constant is attained thereby that as usual with stud or pin nozzles the circular-ring-shaped discharge cross section is changed which means a hollow stream is generated with variable inner diameter (the greater the speed so much smaller accordingly is the inner diameter).

The setting or adjustment of this discharge cross section is attained in a known manner thereby that a needle or pin is introduced into the center of the spray or injection bore with such pin or needle preferably having a circular cross section which is so measured in the diameter thereof that the pin or needle again compensates the cross sectional increase by way of the spray or injection bore enlargement. Again the needle receives a path or course of the cross section thereof changing axially so that by way of corresponding control of the axial position of the needle, there is matching or there can be adapted the spray or injection cross section as to the changing load conditions or speed conditions of the motor. (Compare for this purpose also the German Offenlegungsschrift No. 2709161, page 6, the last three paragraphs thereof as well as the claim wording thereof).

The average man skilled in the art who is active in this field of endeavor is aware of the following:

(a) The average man skilled in the art knows that the speed of the air to which a rotational movement about the combustion chamber longitudinal axis is given is also adjusted by the measurement or size of the cross sections of the flow-in or inlet elements for instance the inlet twist passage for a particular piston speed characterized by the motor speed. Constructive proposals are known in large number for this purpose and for this reason such proposals were not repeated in the present disclosure.

(b) The average man skilled in the art furthermore knows that the discharge speed of the fuel is adjusted by the pressure existing at the nozzle. The means for generating such a predetermined pressure are known to the average man skilled in the art likewise by way of the Offenlegungsschrift No. 2709161.8, of the present applicant Neitz belonging to the assignee of the present invention.

The feature of making both speeds "equal or substantially equal" at rate of speed moreover cannot be considered indefinite or uncertain also if no absolute height or magnitude of the speeds is set forth but rather in the present description only for purposes of example there is mention made of 100 m/s. Moreover the restriction or limitation to particular height, level or magnitude of these speeds was intentionally avoided since the optimum thereof is influenced among other things by way of the size of the motor, by the arrangement of the motor for particular application and the like.

The average man skilled in the art furthermore knows that once cross sections of the inlet elements are selected and rigidly set or adjusted, then the rotational speed of the air changes approximately proportional with the motor speed. If there is further a precondition set as in the cited German reference No. 2709161—Neitz copending with the present German priority disclosure claiming that the injection pressure in the entire operating range of the motor remains constant or substantially constant and accordingly also the discharge speed of the fuel remains substantially constant, there results in a very clearly apparent manner the formation of speed difference or relative speed becoming greater with dropping or decreasing motor speed. The means for maintaining constant the injection pressure used in the present case or situation involving a stud, pin or needle nozzle which generates a hollow stream with variable inner diameter was mentioned already in the German reference No. 2709161—Neitz belonging to the assignee of the present invention. For this reason the description thereof is incorporated herewith by reference thereto without repetition in the present case being considered necessary.

The second inventive feature as to enlargement of the outer diameter of the nozzle opening of the needle nozzle used herewith results therefrom. The inventive concept is clearly described moreover by way of the following disclosure: since with null or zero speed difference also the friction or rubbing between fuel and air is null or zero and consequently the diameter which means the periphery or circumference of the fuel stream is without influence upon the stream disintegration to be avoided at the rate of speed, this diameter can be enlarged or increased without disadvantage. The advantage of this feature is recognizable therein that friction or rubbing results or arises with speed difference or relative speed existing at small speeds and such friction and rubbing is so much more effective for the stream disintegration in accordance with the greater periphery or circumference thereof. The strong disintegration is desired in the sense of the sought direct distribution of the fuel onto the air in the lower speed range. The relationship of the inventively proposed enlargement of the pin or needle nozzle bore as to an "optimum arranged fixed single-hole nozzle" represents a clear directive for action to be taken likewise for an expert active in this field of endeavor. The mentioning of particular diameter figures or numbers intentionally was avoided because these are dependent upon the motor size.

The reduction of the inner diameter of the hollow stream with increasing speed occurs by way of the injection pin or needle of the needle nozzle which carries out an increasingly greater maximum stroke and consequently gradually comes out the bore and brings about an increasing "wall thickness" of the hollow stream. The construction of such a nozzle or jet means is known to the expert or average man skilled in the art from other applications and for other functions and methods. Consequently the same was not repeated in the present disclosure.

The foreign German reference No. 2525770—Urlaub cannot be considered as an anticipation of the present disclosure since this reference is concerned with the configuration of the combustion chamber while the present invention concerns the injection and the behavior of the free fuel stream in the rotating air.

Also the German reference No. 2658833—Müller is no anticipation for the present invention since this reference is concerned exclusively with a hole nozzle or jet while the present disclosure is true and applicable only reducing the velocity of said combustion air approximately in proportion to a decrease of speed of said internal combustion engine and at a nearly constant velocity of introduction of said fuel stream, to provide a velocity difference between the fuel velocity and the air velocity; and selectively controlling the surface area of said fuel leaving said injector means as a function of a pertaining speed of said internal combustion engine so that on increasing the speed thereof the surface area is decreased.

The method of operating air-compressing direct-injecting internal combustion engines includes at least one piston with a combustion chamber of a shape of a body of rotation, and a fuel injector with a controllable outlet and a throttle member for controlling the fuel injection-pressure is disclosed. The velocity of combustion air rotating about the longitudinal central axis of the combustion chamber and the velocity of the fuel stream when leaving the injector are coordinated to one another. The surface area of the fuel which is contactable by combustion air is controllable so that on increase of the speed of the internal combustion engine the surface area is decreased.

The invention is further characterized primarily therein that the diameter of the orifice of the fuel injector means, in conformity with the speed characteristic of the engine, is in a range of about 5% to about 100% greater than the orifice of a fixed optimally designed injector-nozzle, whereby the diameter is increased as the speed ratio characteristic of the engine is increased.

When the velocity of the combustion air and the exit velocity of the fuel are about equal or at least nearly equal at the rated speed of the engine, no friction will be present in the system which would enhance the atomization of the fuel jet. Because of this, an increased contact area, obtained by increase of the diameter of the fuel outlet, between the fuel and combustion air is hardly of any further effect. The advantages which are brought about due to the technique of wall-depositing fuel in the upper operating ranges of the engine are thus fully retained. It should be mentioned, furthermore, that increase of the diameter of orifice of the fuel injector means and thereby of the cross section, which would cause a decrease of the velocity of the fuel jet or stream and thereby of the injection pressure, is balanced by the throttle member arranged in the orifice of the fuel injector means.

In accordance with a preferred embodiment of the invention, fuel is injected into a combustion chamber in the form of a hollow spray with the inner diameter of the hollow spray being decreased as the speed of the internal combustion engine increases to effect reduction of the surface area of the spray between the fuel and the combustion air.

During idling and in the lower speed range and load range, the injection pressure and, accordingly, the exit velocity of the fuel from the fuel injector outlet remain constant. On the other hand, the velocity of the combustion air is considerably decreased in relation to the speed of the engine. This means that a substantial relative velocity or difference in velocities and, accordingly, friction is produced between the fuel and the combustion air; the friction provides an effective atomization of the fuel. This atomization is enchanced by increase, in accordance with the present invention, of the diameter of the fuel jet and, accordingly, its surface area.

Optimal conditions are achieved with an engine having the aforementioned features, i.e. over the full operating range thereof a beneficial mixture-preparation occurs and, accordingly, a complete combustion, with an exhaust gas quality which is in conformity with this complete combustion.

In accordance with a preferred embodiment of the invention, it is proposed that for engines with a speed ration characteristic of up to about 2.5, the diameter of the outlet or orifice of the injector means is in a range between about 5% to about 50% greater than the cross sectional area of a fixed optimally designed single orifice injector-nozzle. For an engine with a speed ratio characteristic of greater than 2.5, the orifice of the injector means is in a range of about 40% to about 100% greater than the cross sectional area of a fixed optimally designed single orifice injector-nozzle. The diameter of such injector-nozzle can, of course, vary over a wide range depending on the size of the motor, etc. Generally they may have a diameter of about 1.0 to 1.5 mm.

The invention will be further described on the basis of a few practical data:

The mean velocity of the fuel jet or stream during injection was selected to be about 100 m/sec. The velocity of the combustion air to contact the fuel in the vicinity of the fuel jet was also selected to be about 100 m/sec at the rated speed of the engine by corresponding operation of the pertaining pump. Thus, the relative velocity, at the upper operating range of the engine, or difference in velocities between fuel and the combustion air, is practically equal to zero. It is assumed, of course, that certain deviations will be present due to the change of velocity at the fuel jet tip. These need not be considered, however. When the speed of the engine is reduced, the circumferential velocity of the combustion air drops considerably, e.g. when the speed characteristic is 4, that is when reducing the speed from 4,000 rpm to 1,000 rpm, a velocity ratio between fuel and combustion air of about 5.5 is present, since the injection pressure of the fuel and, accordingly, the injection velocity thereof, are nearly constant. Thus, at an engine speed of 1,000 rpm, the velocity of the combustion air is about 18 m/sec and the velocity difference, in relation to the fuel velocity, is 82 m/sec.

It should be mentioned that the features of the invention will enable a person of ordinary skill in the art to design an engine of the aforementioned type without further inventive activity.

The unique features of the present invention includes particularly the method step of reducing the velocity of combustion air in proportion to a decrease of the speed of the internal combustion engine and at a constant velocity of introduction of the fuel stream to provide a velocity difference between the fuel velocity and the air velocity should be considered unique and novel together with the final step of selectively controlling the surface area of fuel leaving the injector means as an inverse function of a speed of the internal combustion engine so that upon increasing the speed thereof the surface area is decreased.

The essence of the present invention is recognizable therein that at smaller speeds there occurs an optimum atomization of the fuel and there occurs a direct mixing of the fuel with the combustion air without operating data or characteristic in the upper operating range of the motor being worsened. This is attained thereby that by creation of a hollow stream enlarged in external diameter in comparison to a single-hole nozzle and by in connection with a hollow stream generated by a pin or needle nozzle or jet. The inventive concept at high speeds to assure null or zero for relative speed so that the inventive enlargement of the outer or external diameter here does not bring about any disadvantages with the necessary stream characteristic though in place thereof the advantages of a diameter enlargement in the lower speed range being important and decisive as described cannot be considered obvious or anticipated in any way by way of this reference of Müller.

Figure 7A:
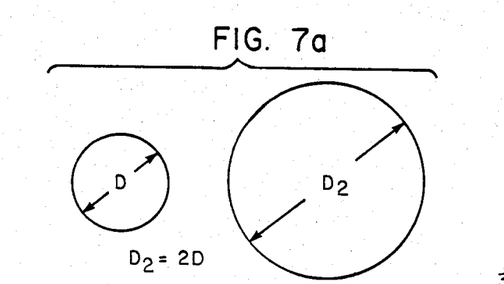

A top view or illustration of FIG. 7a shows an optimum arrangement of a single-hole nozzle or jet; at the top right or substantially center location of the illustration there is shown a pin or needle nozzle or jet with the spray bore being 100% enlarged; the enlargement can suitably also be smaller in value ranging between 5 and 100% enlargement.

The central or median illustration of FIG. 7b shows and represents change of the pin or needle nozzle or jet with the speed for the purpose of adjustment of a constant pressure (or a constant discharge speed); there is generated a hollow stream with variable inner diameter (Di); when the value of Di is small, then there is highest speed and when Di is large there is lower speed. The bottom of FIG. 7c represents the stream discharge cross section.

The features of the present invention can be specifically and more concretely summarized and expressed by the following four paragraphs:

(1) An air-compressing, direct injection combustion machine with a rotational-body-shaped combustion chamber arranged in a piston with which the combustion air flowing therein has a rotary movement conveyed thereto about the combustion chamber longitudinal axis and with which the fuel in part is applied in a film manner upon the combustion chamber wall by means of a needle nozzle or jet controlled in the cross section thereof for fuel application in the direction of air movement in the upper speed range and/or upper load range, while in idling as well as in the lower speed range and/or load range of the motor there occurs direct mixing of the fuel with combustion air as extensively as possible whereby the fuel-injection pressure at the nozzle or jet bore and consequently the discharge speed of the fuel through the throttle pin or needle is kept constant or substantially constant over the entire operating range, characterized thereby that the speed of the rotating combustion air and the discharge speed of the fuel stream are so adapted or matched as to each other that these speeds at rate of speed of motor are equal or substantially equal in the vicinity of the fuel stream and furthermore with decreasing motor speed subject to formation of a relative speed with substantially constant discharge speed of the fuel stream there is noted that the speed of the combustion air is decreased approximately in relationship or in ratio to the motor speed reduction and that the diameter (bore) of the injection nozzle opening (outer diameter of the pin or needle nozzle) each in accordance with the speed ratio of the motor is greater in a range between 5% and 100% than with utilization of an optimum arrangement of a fixed single-hole injection nozzle, whereby the enlargement of the diameter (injection bore) increases with the speed ratio or relationship of the motor.

(2) An air-compressing direct-injection combustion machine according to (1) characterized thereby that the pin or needle nozzle is so embodied or arranged that the fuel is injected as a hollow stream into the combustion chamber over the entire or substantially the entire operating range of the motor and that the selected outer diameter of the hollow stream remains constant at the injection nozzle opening while the inner diameter of the hollow stream is made smaller with increasing speed of the motor.

(3) An air-compressing direct injection combustion machine according to (1) and (2) characterized thereby that with motors having speed ratio up to 2.5 moreover the diameter of the injection nozzle opening is designated in a range of 5% and 50% larger than with utilization of an optimum arrangement of fixed single-hole injection nozzles.

(4) An air-compressing direct injection internal combustion engine according to (1) and (2) characterized thereby that with motors having speed ratio or relationship over 2.5 there is designation or selection of the diameter of the injection nozzle opening in a range between 40% and 100% larger than with utilization of an optimum arrangement of single-hole injection nozzle.

The present invention is, of course, in no way restricted to the specific disclosure of the specification, but also encompasses any modifications within the scope of the appended claims.

What I claim is:

1. A method of operating air-compressing direct-injecting internal combustion engines having at least one piston, a cylinder having a cylinder head, a combustion chamber including a wall formed in said at least one piston, means for introducing air, said combustion chamber in said at least one piston having a cylindrical shape with a longitudinal central axis and being adapted to accommodate movement of air about its longitudinal central axis, injector means for introducing fuel in the direction of movement of air in said combustion chamber and depositing fuel partially as a film on the wall of said combustion chamber in said piston during at least one of the conditions consisting of the group of upper speed range and upper load range, while during idling of said combustion engine and during at least one of the conditions consisting of lower speed range and lower load range, a direct mixing of combustion air and fuel occurs, said injector means having an outlet and means adjustable therewith so that effective cross sectional area of the outlet is selectively controllable, said method comprising in combination the steps of:

introducing combustion air into said combustion chamber to rotate about said longitudinal axis at a predetermined velocity;

injecting a fuel stream at a predetermined velocity into said combustion chamber so that a hollow fuel stream with differing inner diameters of the fuel stream for predetermined surface area of the fuel stream leaving the injector means with varying of inner diameter thereof, has a velocity equal to the combustion air velocity when the engine is operating at its rated speed;

reducing the velocity of the combustion air by varying inner diameter of the fuel stream in proportion to a decrease of speed of said internal combustion engine and at a constant velocity of introduction of said fuel stream, to provide a velocity difference between the fuel velocity and the air velocity; and selectively controlling the surface area of the fuel stream leaving the injector means by varying inner diameter of the fuel stream as an inverse function of a speed air said internal combustion engine so that upon increasing the speed thereof the surface area is decreased.

2. A method in combination according to claim 1, wherein injecting of fuel occurs as a hollow annular fuel stream with inner-outer diameters into said combustion chamber in said piston during any point of the full operating range of said internal combustion engine only subject to steps of decreasing the inner diameter of said hollow stream as the speed of said internal combustion engine is increased to effect reduction of the surface area of said stream between fuel and combustion air and vice versa increasing the inner diameter of said hollow stream as speed of said internal combustion engine is decreased to effect increase of the surface area of said stream between fuel and combustion air.

3. A method in combination according to claim 2, wherein maintaining of the outer diameter of said stream of fuel is substantially constant at the injector nozzle outlet.

4. A method in combination according to claim 1, wherein said step of reducing the velocity of said combustion air comprises substantially reducing only the velocity of said combustion air with constant fuel velocity.

5. A method in combination according to claim 1, wherein said controlling assures the cross sectional area of said fuel stream is selectively controlled so as to be about 5% to about 100% greater than the cross sectional area of a fixed single orifice injector-nozzle.

6. A method in combination according to claim 1, wherein said step of selectively controlling is carried out dependent upon speed ratio characteristic provided by the ratio of rated speed to actual speed of said internal combustion engine.

7. A method in combination according to claim 6, wherein, when said internal combustion engine has a speed ratio characteristic of up to about 2.5, said step of selectively controlling is carried out such that the effective cross sectional area of said outlet is in a range from about 5% to about 50% greater than the cross sectional area of a fixed single orifice injector-nozzle.

8. A method in combination according to claim 6, wherein, when said internal combustion engine has a speed characteristic greater than 2.5, said step of selectively controlling is carried out such that the effective cross sectional area of said outlet is in a range from about 40% to about 100% greater than the cross sectional area of a fixed single orifice injector-nozzle.

* * * * *